2,952,718

PROCESS FOR MAKING ACETYLENIC COMPOUNDS BY CONTACTING ALKYL ACETYLENES WITH OXYGEN AND A COPPER SALT

James Charles Kauer, Wilmington, Del., assignor to E. I. du Pont de Nemours and Company, Wilmington, Del., a corporation of Delaware No Drawing. Filed May 2, 1958, Ser. No. 732,441

13 Claims. (Cl. 260—678)

This invention relates to the production of compounds having the formula

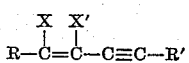

wherein R and R' represent lower alkyl groups and X and X' represent hydrogen and when taken together constitute a single bond, from alkyl acetylenes.

It has long been known that acetylene dimerizes to monovinylacetylene in the presence of a copper catalyst and in the absence of oxygen. This reaction has become the basis for the industrial production of monovinylacetylene which is employed to form 2-chlorobutadiene, the polymeric form of which is a superior elastomer. This addition reaction of acetylene to itself has been regarded as unique. Raphael in "Acetylenic Compounds in Organic Synthesis," Butterworth's Publications, London, 1955, points out on page 105 that "The process seems to be specific for acetylene itself; attempts to extend it to ethynyl compounds in general have been uniformly unsuccessful unless acetylene is employed as a component." The dimerization of acetylene is conventionally effected in an aqueous cuprous chloride and ammonium chloride solution. Furthermore, oxygen is excluded in the process since explosive by-product peroxides are thereby formed (see Nieuwland and Vogt, "The Chemistry of Acetylene," Reinhold, N.Y., 1945, pages 162–4).

It has now been found that acetylenes of the formula RC≡CH wherein R is lower alkyl, can produce compounds of the above mentioned formula

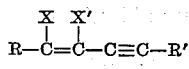

by contacting a catalytic system comprising a copper salt and oxygen with the alkylacetylene in a liquid hydrocarbonitrile medium at a temperature of above 100° C.

The acetylenic compounds that can be used in the process of this invention are the lower alkylacetylenes, i.e., compounds of the formula RC≡CH wherein R is an alkyl radical of 1–4 carbons. Acetylenes included in addition to methylacetylene are ethylacetylene, propylacetylene and butylacetylene. The products formed from the lower alkyl acetylenes are sufficiently volatile to be readily removed from the hot reaction mixture since they boil at temperatures below 225° C. Of these acetylenes, methyl- and ethylacetylene are preferred.

The medium for the reaction should be substantially anhydrous. Organic nitriles that are liquid in the temperature range of the reaction, i.e., between 100–225° C., and that are inert under the reaction conditions are employed. Nitriles free from open chain unsaturation are suitable. Preferred nitriles are the hydrocarbonitriles and include aryl nitriles such as benzonitrile and the tolunitriles; alkyl nitriles such as caprinitrile; and the dinitriles; e.g., succinonitrile, glutaronitrile and adiponitrile.

The copper salt for the reaction is preferably an inorganic cuprous compound. Cuprous halides are suitable particularly cuprous chloride since it is readily available and relatively cheap. Cuprous cyanide can also be used either alone or in admixture with the cuprous halide. Cupric salts such as cupric acetate can be employed initially, particularly when higher proportions of diyne are desired in the product. In the presence of monoalkylacetylenes, at least some of the cupric salt is believed reduced to the cuprous state.

To maintain high catalytic activity, it is desirable to add hydrogen halide, particularly hydrogen chloride, or a hydrogen halide salt of ammonia or preferably of a tertiary lower alkyl amine to the system. Hydrogen halide can be introduced during the reaction. Small amounts of ammonium or trialkylammonium chloride can be added to the organonitrile solution before the alkylacetylene is passed into the system. The amount of the hydrohalide used is substantially less then the weight of cuprous salt.

The active catalyst system is obtained after the oxygen is introduced into the copper-hydrocarbonitrile system. It is noted that absorption of considerable amounts of the alkylacetylene takes place when it is first passed into the catalyst solvent system before evidence of desired product formation is observed. While the exact mechanism of the catalyst is not understood, it is probable that a complex of copper salt, oxygen and alkylacetylene is formed which in the nitrile medium represents the active catalyst system. The initial use of alkylacetylene and oxygen to activate the catalyst system may be called "catalyst conditioning" or "activation." Oxygen is necessary for the reaction. The source can be an oxygen-containing gas such as air or commercially available oxygen. Although the total amount of oxygen introduced is subject to wide variation and depends on the efficiency with which it is used, at least 0.1 mole of oxygen, as well as at least about 0.1 mole of the monoalkylacetylene, per mol of copper salt is required to activate the catalyst system.

The rate of oxygen addition to the system can be varied. After initial conditioning, i.e., by introduction of the alkylacetylene and oxygen, the oxygen rate can be reduced or even stopped for periods of time with the result that at times a higher ratio of the dialkyl vinylacetylene is produced with less contamination of the homogeneous solvent-catalyst system by tarry products. Activity of the catalyst decreases after a period of time in the absence of added oxygen. Oxygen should again be introduced to maintain high activity of the catalyst when the rate of desired product formation declines.

The temperature employed for the novel process of this invention is within the range of 100–225° C. Preferably the temperature is 125–175° C. with 130–150° being particularly suitable. The temperature selected must be above 100° C. and below the boiling point of the nitrile solvent. The temperature should be such that the nitrile solvent has a low vapor pressure while the reaction products are in the vapor phase.

The reaction takes place rapidly. The process is most advantageously effected in a continuous manner with the monoalkylacetylene and oxygen introduced into the reaction zone and the coupled products removed as formed. The time for reaction is only that necessary for the reactants to contact the catalyst in the homogeneous system.

In the reaction system, the weight ratio of nitrile solvent to cuprous salt can vary within wide limits. Most useful are ratios of between 1 to 1 and 10 to 1 of nitrile to salt.

The products obtained by the process of this invention are primarily those of the structure RC≡C—CH=CHR' wherein R and R' are lower alkyl which may be the same or different. When large amounts of oxygen are used, there is obtained substantial amounts of the diacetylene RC≡C—C≡CR'.

The products of this reaction are readily separated from the reaction mixture. They have relatively high vapor pressures at the reaction temperature. The volatile dimerized products are easily condensed since they boil generally in the range of 90–225° C. Unreacted monoalkylacetylene employed is recovered and can be recirculated.

The dimerized products of this invention are antioxidants, i.e., they selectively absorb oxygen. The 2-hexen-4-ynes add hydrogen halides, e.g., when added to a solution of concentrated hydrochloric acid and cuprous chloride, the corresponding chlorohexadiene results. Sulfuryl chloride reacts with cis-2-hexen-4-yne to give a tetrachloro product boiling at 84–87° C. at 14 mm.

The following examples further illustrate the practice of this invention.

Example I

Methylacetylene at the rate of 0.45 mole/hr. and oxygen at the rate of 0.22 mole/hr. were conducted as a mixture through a 6 ft. length of 7 mm. glass tubing to the bottom of a vertical tube 35 mm. in diameter and 155 cm. long containing a solution of 150 g. of commercial cuprous chloride in 750 g. of benzonitrile. The exit gases were passed through a water-cooled condenser to remove the liquid product, and the noncondensable portion was passed into a second catalyst tube (25 x 500 mm.) containing a solution of 50 g. of cuprous chloride in 250 g. of benzonitrile. The exit gases from this tube were passed through a water-cooled condenser and the noncondensable portion was passed through two Dry Ice traps to recover unreacted methylacetylene. The catalyst tubes were heated to 140° C. by refluxing xylene vapor. The initial black color of the catalyst slowly faded to straw yellow. A slow stream of hydrogen chloride gas was admitted to the inlet gas stream of both catalyst tubes until the black color was restored.

The mixture of oxygen and methylacetylene was passed through the catalyst for about 3½ hours to condition the catalyst, during which time 66 g. of methylacetylene was injected and 33 g. was recovered with no liquid product obtained. Hydrogen chloride addition was repeated when the color faded. The catalyst solutions were then cooled, and 150 g. of cuprous chloride, 120 g. of trimethylamine hydrochloride and 30 g. of cuprous cyanide were added to the first catalyst tube; and 50, 40, and 10 g., respectively, of these reagents were added to the second tube. The catalyst tubes were again heated to 140°, and on admission of a mixture of methylacetylene (0.45 mole/hr.) and oxygen (0.15 mole/hr.) liquid product began to condense.

A series of eight approximately seven-hour runs was made. A total of 1278 g. of methylacetylene was injected, and 439 g. was recovered in the Dry Ice traps. The liquid products were separated into a water layer (78 ml.) and an organic layer (780 ml.). The latter was dried over magnesium sulfate and distilled through a 16-inch column packed with Podbelniak Helipak using a reflux ratio of at least 4:1. The following table shows products obtained.

| B.P. | Weight, g. | Identity | Percent Yield |
|---|---|---|---|
| 55–56° C | 45 | Acetone | 4 |
| 84–89° C | 9.8 | Yellow ketonic fraction | ~1 |
| 89–92.6° C | 210 | Cis-2-hexen-4-yne | 25 |
| 92.6–101° C | 90 | Trans-2-hexen-4-yne | 11 |
| 125–130° C | 78 | 2,4-hexadiyne | 10 |

The residue was chiefly benzonitrile (i.e., recovered solvent). Redistillation of the third and fourth fractions yielded cis-2-hexen-4-yne, B.P. 89.5–90.5° C.; $n_D^{25}$, 1.4590 and trans-2-hexen-4-yne, B.P. 99° C.; $n_D^{25}$, 1.4635. From a similar experiment the cis and trans forms of 2-hexen-4-yne were purified by distillation and vapor phase chromatography and analyzed.

| | Anal. Calcd. | Found Cis | Found Trans |
|---|---|---|---|
| C | 89.9 | 89.8 | 89.1, 88.9 |
| H | 10.1 | 10.2 | 10.1, 9.9 |
| M.W. | 80.1 | 76, 80 | 78, 79 |
| M.R. | 27.38 | 28, 58 | |

Hydrogenation of these compounds yielded n-hexane. Both compounds exhibited the characteristic ultraviolet absorption spectrum of a disubstituted butenyne ($\lambda_{max}$ 2230 A., $\epsilon$=12,000 for cis and $\lambda_{max}$ 2250 A., $\epsilon$=12,000 for trans). [See Gillam and Stern, "Electronic Absorption Spectroscopy," Edward Arnold, London (1955), pp. 88–90.] The infrared spectra showed the presence of a non-terminal acetylene function and the absence of a terminal methylene group. The characteristic "cis" absorption at 715 cm.$^{-1}$ in the product boiling at 89.5–90.5° C. and the "trans" absorption at 950 cm.$^{-1}$ of the product boiling at 99° C. were used to assign the configurations of these products. [See Bellamy, "The Infrared Spectra of Complex Molecules," New York, John Wiley & Sons, Inc. (1954), pp. 40–42.]

The following characteristic wave numbers were obtained by Raman spectral analysis of trans-2-hexen-4-yne: 2982, 2902, 2220, 1628, 1431, 1370, 1275, 785, 635, 454 and 293. The corresponding wave numbers for cis-2-hexen-4-yne were: 3018, 2948, 2902, 2845, 2220, 1615, 1430, 1390, 1370, 1235, 1140, 483, 465, and 442.

Example II

When the general procedure of Example I was repeated except that oxygen flow was stopped after the catalyst conditioning (i.e., at the time the trimethylamine hydrochloride was added to the catalyst-benzonitrile containing tube). A higher ratio of the purer 2-hexen-4-ynes was obtained with less ketonic products and less 2,4-hexadiyne.

Example III

A mixture of oxygen, methylacetylene and a small amount of ethylacetylene was passed through a solution of cupric chloride and ammonium chloride in benzonitrile heated at 135–140° C. The products obtained were fractionally distilled. Of the products, 2,4-hexadiyne and 2,4-heptadiyne were identified.

Example IV

A gas mixture composed of oxygen (0.2 mole/hr.), methylacetylene (0.4 mole/hr.), and hydrogen chloride (0.001 mole/hr.) was passed into a stirred solution of 200 g. of cuprous chloride and 22 g. of cuprous cyanide in 300 g. of benzonitrile heated to 130° C. After 2.5 hours the temperature of the flask was raised to 160° C. and the distillate (chiefly crude 2,4-hexadiyne) was dissolved in carbon disulfide, dried over magnesium sulfate and distilled to yield 10.0 g. of 2,4-hexadiyne, B.P. 127–130° C., M.P. 68–69° C.

When the above general procedure was repeated except that a temperature of 138° C. was used for the benzonitrile and a mixture of methylacetylene, oxygen and nitrogen was passed into the reaction tube, yields of 55–73% of products comprising 2,4-hexadiyne and 2-hexen-4-ynes were obtained in continuous experiments.

When the general procedure of Example IV was repeated except that adiponitrile was employed in place of benzonitrile, dimerization also took place.

An important and unexpected advantage resulting when an organonitrile is used as the reaction medium in accordance with the present process is that high yields of desired products are obtained.

I claim:

1. A process for making from 1-4 carbon atom alkyl substituted acetylenes, compounds of the group consisting of RC≡C—CH=CHR' and RC≡C—C≡CR' wherein R and R' are alkyl groups of from 1-4 carbons, which comprises contacting with oxygen and with a copper salt the alkylacetylene in a liquid hydrocarbonitrile medium at a temperature above 100° C. and below the boiling point of the nitrile solvent.

2. The process of claim 1 wherein the copper salt comprises an inorganic cuprous compound.

3. The process of claim 1 wherein the copper salt is cuprous chloride.

4. The process of claim 1 wherein the nitrile medium is benzonitrile.

5. The process of claim 1 wherein the 1-4 carbon atom alkyl substituted acetylene is methylacetylene.

6. The process of making 2-hexen-4-yne which comprises contacting methylacetylene with cuprous chloride and oxygen in benzonitrile, at a temperature above 100° C. and below the boiling point of the nitrile solvent.

7. The process of claim 1 wherein the temperature of reaction lies between 125–175° C.

8. The process of claim 1 wherein the nitrile medium is adiponitrile.

9. The process of claim 1 wherein the copper salt is cupric chloride.

10. The process of claim 1 wherein hydrogen chloride is added to maintain high catalytic activity.

11. The process of claim 1 wherein the copper salt is a mixture of cuprous chloride and cuprous cyanide.

12. A process comprising contacting methylacetylene with oxygen, hydrogen chloride, and a copper salt in a liquid hydrocarbonitrile medium at a temperature above 100° C. and below the boiling point of the nitrile solvent.

13. A process comprising contacting a mixture of methylacetylene and ethylacetylene with oxygen and with cupric chloride in benzonitrile above 100° C. and below the boiling point of the nitrile solvent.

References Cited in the file of this patent

UNITED STATES PATENTS

| | | |
|---|---|---|
| 2,131,197 | Stadler et al. | Sept. 27, 1938 |
| 2,316,536 | Fuchs | Apr. 13, 1943 |

OTHER REFERENCES

Slobodin et al.: Article in "Zhur. Obschei," abstracted in Chem. Abstracts, vol. 50, Oct. 25, 1956, page 14502C.